United States Patent [19]

Meadows

[11] 4,174,984
[45] Nov. 20, 1979

[54] MACHINE FOR AND METHOD OF MAKING TUBULAR CONDUIT OF INDEFINITE LENGTH

[75] Inventor: Roger D. Meadows, Waynesville, N.C.

[73] Assignee: Dayco Corporation, Dayton, Ohio

[21] Appl. No.: 948,067

[22] Filed: Oct. 2, 1978

[51] Int. Cl.$^2$ ............................................. B65H 81/00
[52] U.S. Cl. ..................................... 156/143; 156/195; 156/429; 156/446
[58] Field of Search ................ 156/184, 143, 187–188, 156/195, 425, 428–432, 446; 198/840, 660, 677, 778

[56] References Cited

U.S. PATENT DOCUMENTS

| | | | |
|---|---|---|---|
| 2,731,070 | 1/1956 | Meissner | 156/143 |
| 3,144,072 | 8/1964 | Karbowink | 156/143 X |
| 3,155,559 | 11/1964 | Hall | 156/195 |
| 3,533,883 | 10/1970 | Gartaganis | 156/195 X |
| 3,548,724 | 12/1978 | Hall | 156/195 X |
| 3,914,151 | 10/1975 | Poulsen | 156/429 X |
| 3,979,250 | 9/1976 | Drostholm | 156/195 X |

Primary Examiner—David A. Simmons
Attorney, Agent, or Firm—Reuben Wolk

[57] ABSTRACT

A machine and method are provided employing an elongate mandrel supported at one end and unsupported at its opposite end and apparatus carried by the mandrel and being movable therealong between the opposite ends with the apparatus supporting material wound thereon to define a length of the tubular conduit and moving out of supporting relation once the conduit moves axially beyond the opposite end, and the mandrel comprises a fixed helical structure supported concentrically around a central part which is rotatable therewithin and with the helical structure defining a helical groove along the mandrel with a plurality of members defining the apparatus and being operatively connected to the central part and movable within the groove upon rotation of the central part with the members supporting material helically wound thereon and moving out of supporting relation by falling within the length of conduit at the opposite end.

20 Claims, 7 Drawing Figures

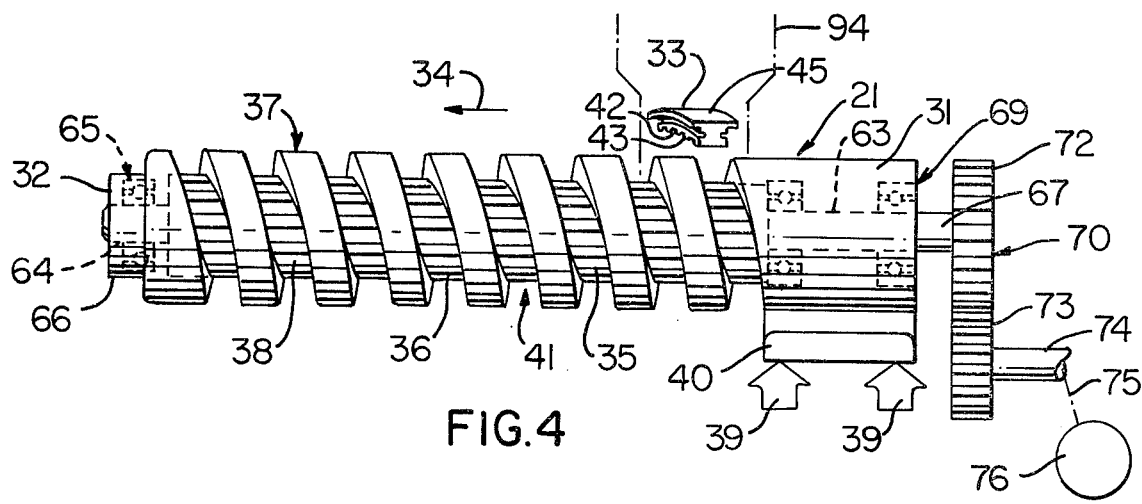
FIG.4
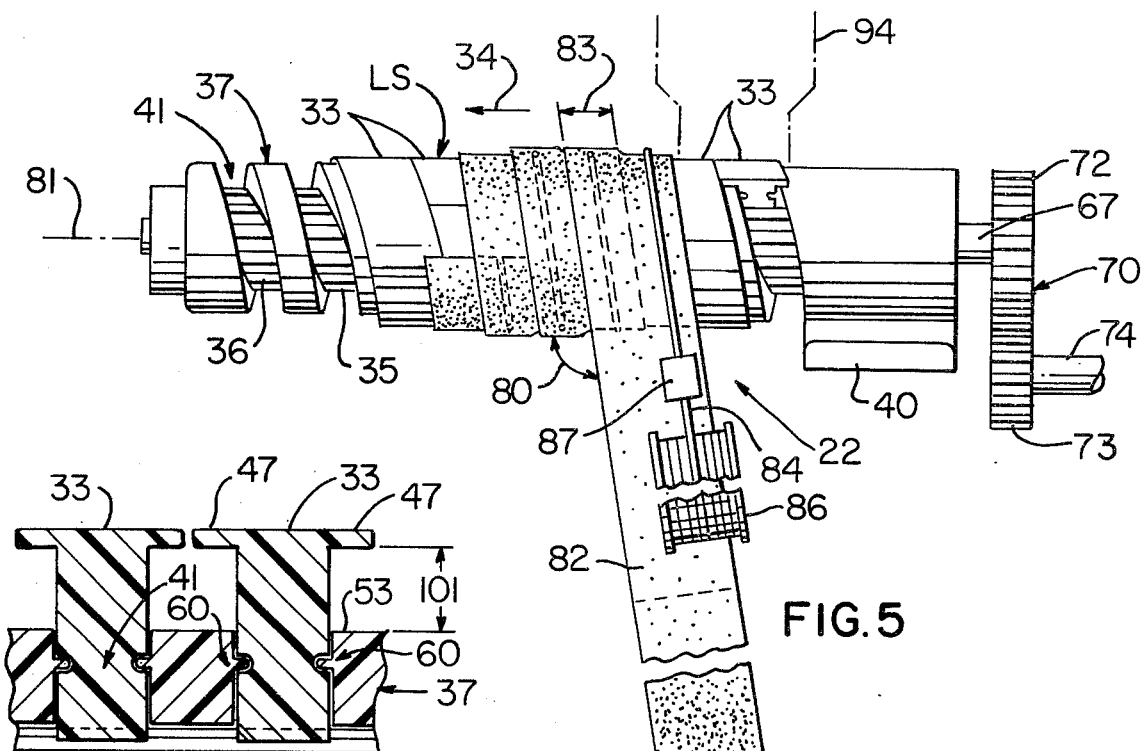
FIG.5
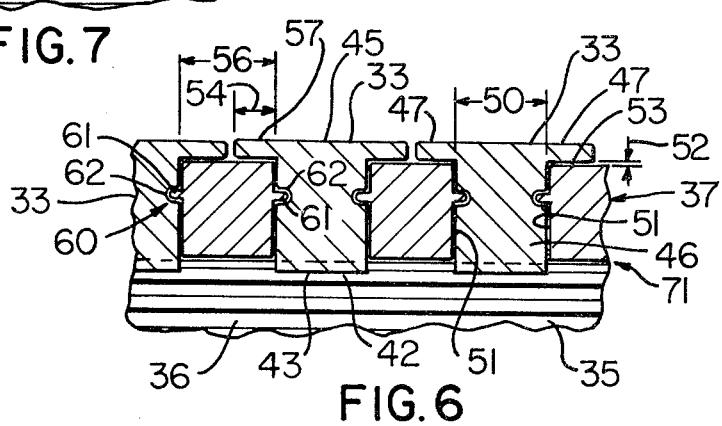
FIG.7
FIG.6

MACHINE FOR AND METHOD OF MAKING TUBULAR CONDUIT OF INDEFINITE LENGTH

BACKGROUND OF THE INVENTION

1. Field of the Invention

This invention relates to a machine for and method of making tubular conduit of indefinite length and more particularly to a so-called live surface mandrel employed with such machine and method.

2. Prior Art Statement

Machines and methods for making tubular conduit of indefinite length and having a substantially smooth inside surface have been proposed previously and often employ mandrels having a so-called live surface. For example, see U.S. Pat. Nos. 3,548,724 and 3,271,064 which employ so-called endless belts movable about a central part of a mandrel to provide the so-called live surface for such mandrel. However, a mandrel of this type which employs an endless belt to define a live surface therefor is generally expensive to construct and operate; and, it is difficult to produce a conduit of comparatively small inside diameter on a mandrel of this type.

So-called live surface mandrels have also been proposed which use a series of internal rollers to define such live surface; however, mandrels of this type are categorically considered incapable of producing conduits each having a smooth inside surface and of minimum diameter and thus prior art of mandrels of this type are not considered pertinent.

SUMMARY

It is a feature of this invention to provide a simple and economical machine for and method of making a tubular conduit of indefinite length and having a smooth inside surface.

Another feature of this invention is to provide an improved so-called live surface mandrel of unique construction for use with such machine and method to make such tubular conduit which is also reinforced and of minimum diameter.

Another feature of this invention is to provide a machine for and method of making tubular conduit of the character mentioned employing a unique live surface mandrel which is readily usable with other components and apparatus commercially available and used to manufacture flexible conduits.

Another feature of this invention is to provide a machine and method of the character mentioned employing such unique live surface mandrel defined of simple component parts which are economically produced.

Another feature of this invention is to provide a machine for and method of making a tubular reinforced conduit of the character mentioned employing a strip of polymeric material which is helically wound and has overlapped turns provided with a reinforcing member which is sandwiched between the overlapped turns.

Another feature of this invention is to provide a machine for and method of making a tubular reinforced conduit of the character mentioned employing such unique live surface mandrel wherein only a plurality of identical members defining the live surface of such mandrel are changed to define conduit of different size.

Another feature of this invention is to provide a machine for and method of making tubular conduit of indefinite length employing an elongate mandrel supported at one end and unsupported at its opposite end and apparatus carried by the mandrel and being rotatably and axially movable therealong between the opposite ends with the apparatus being adapted to support material wound thereon to define a length of the tubular conduit and moving out of supporting relation once the length of tubular conduit moves axially beyond the opposite end, and the mandrel comprises a helical structure supported at a fixed position concentrically around a central part with the central part being rotatable therewithin and with the helical structure defining a helical groove along the mandrel between the helical turns with a plurality of members defining the apparatus and being operatively connected to the central part and movable within the groove upon rotation of the central part with the members being adapted to support the material helically wound thereon and moving out of supporting relation by falling within the length of tubular conduit at the opposite end.

Therefore, it is an object of this invention to provide an improved machine for and method of making a tubular conduit of indefinite length having one or more of the novel features set forth above or hereinafter shown or described.

Other details, features, uses, objects, and advantages of this invention will become apparent from the embodiment thereof presented in the following specification, claims, and drawings.

BRIEF DESCRIPTION OF THE DRAWINGS

The accompanying drawings show a present preferred embodiment of this invention, in which

FIG. 4 is a view particularly illustrating the live surface mandrel of FIG. 1 and a typical exemplary member which is operatively associated therewith to define the live surface of such mandrel;

FIG. 5 is a view similar to FIG. 4 and particularly illustrating the manner in which an elongate polymeric strip and a reinforcing wire are helically wound about the live surface of the mandrel to define the tubular conduit;

FIG. 6 is an enlarged fragmentary cross-sectional view taken parallel to the axis of the mandrel of FIG. 4 and showing a plurality of members disposed within a helical groove of such mandrel to define the live surface thereof; and FIG. 7 is a view similar to FIG. 6 illustrating a modification of the mandrel.

DESCRIPTION OF ILLUSTRATED EMBODIMENTS

Figure 1:
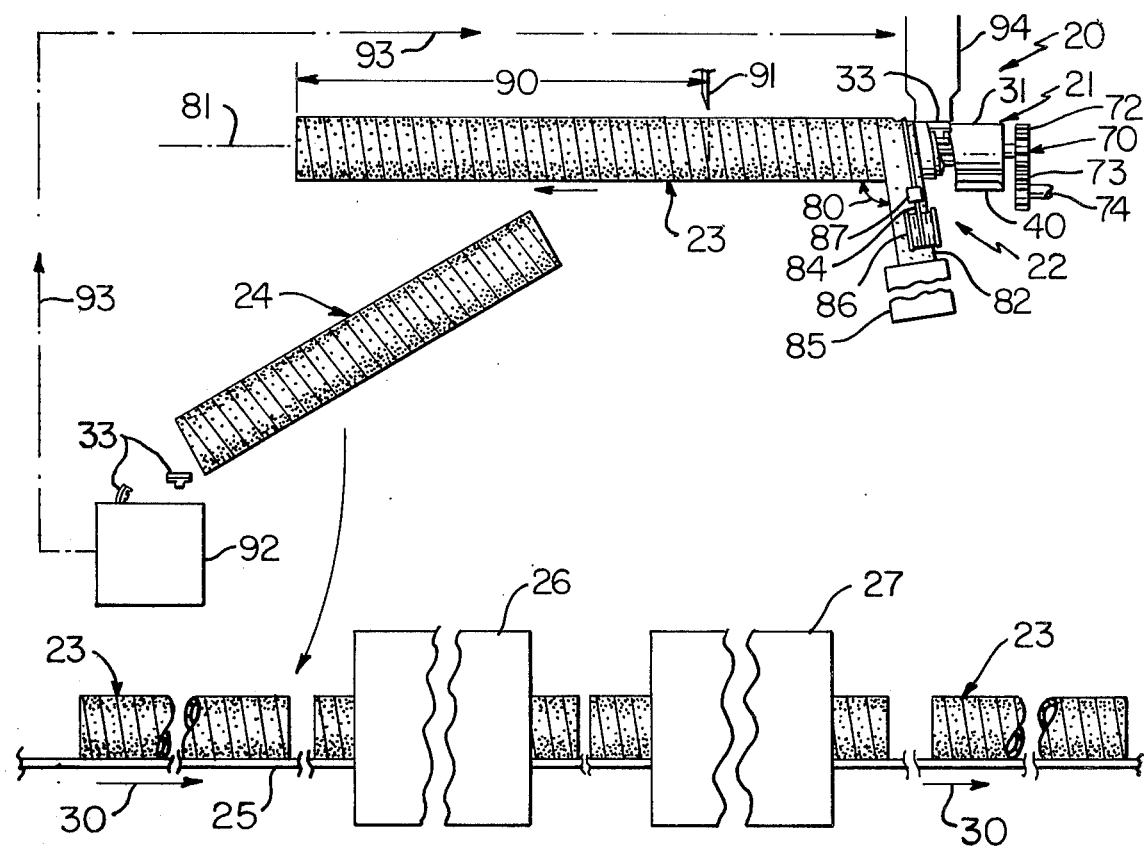
FIG. 1 is a view with parts in elevation, parts in cross-section, parts broken away, and parts shown schematically illustrating one exemplary embodiment of the machine and method of this invention employing a unique live surface mandrel of this invention.

Reference is now made to FIG. 1 of the drawings which illustrates one exemplary embodiment of a machine for and method of making tubular circuit of indefinite length and which has a substantially smooth inside surface with such machine and method being designated generally by reference numeral 20. The machine 20 comprises an elongate mandrel which is designated generally by the reference numeral 21 and which will be described in detail subsequently and such mandrel is particularly adapted to support material which is wound thereon in a helical manner as illustrated at 22 and as will be described in more detail subsequently to define conduit designated generally by the reference numeral 23 and of indefinite length. After forming of the conduit 23, it is cut into predetermined lengths thereof with a typical length thereof being shown at 24 and moved by suitable conveying means such as a belt conveyor 25 first through a curing oven 26 followed by a cooling chamber 27 and after exiting the cooling chamber each conduit length is packaged for storage and sale using any suitable technique known in the art. The conveyor 25 may be moved or powered by suitable moving means indicated schematically by arrows 30.

Referring now to FIGS. 4 and 5 of the drawing, it is seen that the mandrel 21 is supported at one end 31 thereof and unsupported at its opposite end 32. The mandrel 21 carries apparatus in the form of a plurality of members 33 which will be described in detail subsequently. Only one of the members 33 is shown in FIG. 4 and such members are adapted to support the material wound thereon at 22 (FIG. 1) to define a particular length of conduit 23 and the members 33 move out of supporting relation once a particular length of tubular conduit 23 moves axially beyond the end 32. Each member 33 moves along the mandrel 21 in the direction indicated by arrow 34 in FIG. 4 and the manner in which such movement is achieved will now be described.

In particular, the mandrel 21 comprises a rotatable central part 35 which is in the form of a splined shaft having axially extending circumferential teeth 36 and such teeth are substantially identical and are provided in equal angularly spaced relation about the circumference of the splined shaft and cooperate with grooves or recesses 38 between such teeth to define the outside surface of the splined shaft 35.

The mandrel 21 also comprises a helical structure 37 which is fixed to a support 40 which is in turn supported at a fixed position by a supporting frame indicated schematically by arrows 39 and support 40 is the support for end 31 of the overall mandrel 21. The helical structure 37 is thus fixed to the support 40 and extends therefrom in a substantially cantilevered manner and in a fixed relation or position concentrically around the central part or splined shaft 35. The clearances between the inside surface of the helical structure 37 and the outside diameter over the teeth 36 of the splined shaft 35 are such that the splined shaft 35 is freely rotatable within the helical structure 37.

The helical structure 37 defines a helical groove 41 along the mandrel 21 and the groove 41 is particularly adapted to receive a plurality of members 33 therewithin and such members 33 are operatively connected to the central part of the splined shaft 35 such that the members are adapted to support the conduit defining material wound thereon as shown at 22. The members 33 move out of supporting relation by moving completely out of the helical groove 41 and falling by gravity within a length of tubular conduit 23, FIG. 1, at the opposite or unsupported end 32 of the mandrel 21.

As previously indicated the apparatus of mandrel 21 which is adapted to support material wound thereon to define reinforced tubular conduit 23 comprises the plurality of members 33. As best seen in FIG. 4 each member 33 is basically an arcuate or curved member which is adapted to fit within the helical groove 41 so that it conforms to the outside surface of the helical structure 37 and each member 33 has an arcuate inside surface 42. The inside surface 42 is a toothed surface having a plurality of teeth 43 with the teeth 43 being received within the recesses 38 defined between immediately adjacent teeth 36 of the splined shaft 35 and the teeth 43 cooperating with the teeth 36 to provide an operative connection between the splined shaft 35 and the members 33. It will also be seen that each of the members 33 has an arcuate outside surface 45 with the arcuate outside surfaces 45 of members 33 overlying the helical groove 41.

Each of the members 33 has a substantially T-shaped cross sectional configuration (FIG. 6) and such T-shaped configuration is defined by a leg 46 and a pair of transverse arms 47 extending from opposite sides of the leg 46 with the leg 46 having a width 50 which enables receipt thereof within the groove 41 and there is sufficient clearance between the leg 46 and opposed surfaces 51 defining the sides of the helical groove 51 to facilitate easy sliding movement therealong. Each arm 47 extends from its leg 46 a sufficient distance above its teeth 43 such that with movement of its member 33 along the groove 41 a clearance 52 is provided between the outside helical surface 53 of the helical structure 37 and the inwardly disposed surface of such arm 47. Each arm 47 extends from its associated side of leg 46 a distance 54 which is slightly less than one-half of the width 56 of the helical structure 37. The arms 47 have top surfaces each designated by the same reference numeral 57 which, in essence, define surface extensions of an associated adjoining arcuate outside surface 45. The arcuate surfaces 45 and their arcuate surface extension 57 define a substantially full right circular cylindrical surface which is completely movable. Thus, the mandrel 21 has an outside surface which is commonly referred to in the art as a live outside surface which will be designated generally by the reference letters LS, FIG. 4.

The mandrel 21 has retaining means designated generally by reference numeral 60 in FIG. 6 acting between the members 33 and helical structure 37 with such retaining means preventing radial movement of the members 33 relative to such structure and splined shaft 35. The retaining means 60 comprises at least one projection and in this example comprises a pair of projections 61 extending from structure 37. Each projection 61 extends from an associated surface 51 of the helical structure 37. The retaining means also comprises a pair of cooperating channels 62 in each member 33 with each channel 62 being provided in a side of the leg portion 46 of its member 33. As each member 33 is introduced into the mandrel 21 to define the live surface LS of such mandrel each member 33 moves into position with its channel 62 surrounding an associated projection 61 and with sufficient clearance therebetween to assure movement of member 33 along helical groove 41 with minimum friction yet while still providing the required operative engagement between teeth 43 and 36.

Instead of providing projections 61 on the helical structure 37 it will be appreciated that such projections could be provided on the leg 46 of each member 33 with cooperating grooves 62 being provided in the helical structure 37. Further, instead of retaining each member 33 with associated components of retaining means on opposite sides thereof the retaining function may be achieved employing retaining means provided on only one side of member 33.

The mandrel 21 of this example has antifriction bearing means between the helical structure 37 and the splined shaft 35 (FIG. 4). In particular, it will be seen that the splined shaft 35 has a pair of plain right circular cylindrical ends of reduced outside diameter consisting of end 63 at the supported end 31 of the mandrel 21 and end 64 at the opposite or unsupported end 32 of such mandrel. The antifriction bearing means comprises an antifriction ball bearing assembly 69 acting between cylindrical end 63 and the support structure 40 and an antifriction bearing assembly 65 between cylindrical end 64 and a structure 66 which is fixed to the terminal end portion of the stationary helical structure 37.

The mandrel 21 has an extension 67 extending outwardly of the right circular cylindrical reduced diameter end 63 and extension 67 extends outwardly of the structure 40. Drive means designated generally by the reference numeral 70 is provided for rotating the extension 67 and hence end 63 and splined shaft 35. The extension 67 may be fixed to the end 63 of splined shaft 35 as a separate part or may be defined as an integral part of the splined shaft 35 as a single piece structure. The shaft 35 is thus rotated within structure 37 employing the drive means 70 with the helical structure 37 supported in a cantilevered manner and the clearance between the outside surface of the teeth 36 and the inside surface of the helical structure 37 as shown at 71 in FIG. 6 is such that rotation of the splined shaft is achieved in a free and unobstructed manner. The drive means 70 employed may be of any suitable type known in the art and in this example comprises a driven gear 72 fixed to the extension 67 and such gear is rotated by driving gear 73 which is fixed to a shaft 74 which is in turn mechanically connected by suitable connection 75 to a drive motor 76 which may be an electric drive motor, or the like.

Having described the machine 20 in detail, reference is now again made to FIG. 1 of the drawing for a detailed description of certain method steps which are employed in defining the tubular conduit 23 of indefinite length. As indicated earlier, the mandrel 21 is supported only at its end 31 and has its opposite end 32 unsupported; and, such mandrel 21 has apparatus comprised of the members or segments 33 which are carried thereon and move therealong upon rotating splined shaft 35 to define the substantially continuous live surface LS. As indicated at 22 in FIGS. 1 and 5, conduit defining material is continuously wound on the apparatus or members 33 in a helical pattern, and in this example at an angle 80 with the central longitudinal axis 81 of the mandrel 21.

Figure 3:
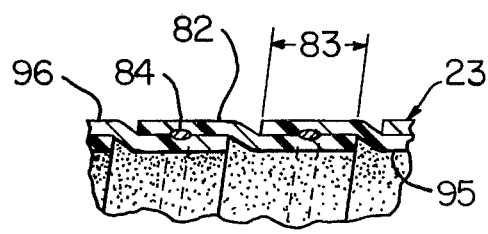
FIG. 3 is a fragmentary cross-sectional view taken essentially on the line 3—3 of FIG. 2.

The winding of the material on the members 33 comprises winding a polymeric material in the form of a polymeric strip 82 of rectangular cross sectional configuration with overlapped portions as indicated at 83 in FIG. 5; and, inasmuch as the conduit 23 defined by this type of process is preferably a reinforced conduit, a reinforcing member shown as a reinforcing wire 84 is wound in sandwiched relation between the overlapped portions at 83. The wire 84 may be any suitable wire employed in the art and may be of any suitable cross-sectional configuration whether circular or non-circular. In this example the wire 84 is illustrated in FIG. 3 as being of roughly elliptical cross section.

The strip 82 may be a preformed strip of any suitable type known in the art; however, in this example of the invention such strip is shown as being a freshly extruded strip which emerges from an extruder indicated schematically by a rectangular block 85 in FIG. 1. While such freshly extruded strip is still hot it is conveyed from the extruder 85 and helically wrapped around the live surface LS of the mandrel 21. During helical wrapping of strip 82, the wire 83 is suitably unwound from a supply spool 86 thereof and slightly preformed employing a preforming die 87 so that it will be readily wrapped in position between the overlapped portions 83 of the strip 82.

As the wrapping continues around the live surface LS it will be seen that a tubular conduit 23 is defined and has a cylindrical inside surface. The live surface is, in essence, continuously moving and moves from end 31 to end 32 of the mandrel 21. As the members 33 move to end 32 they move out of supporting relation from the conduit 23 in that, in essence, they fall out of their helical groove 41 because such groove ends whereby such members fall within the conduit 23. With the members in the conduit and after a predetermined length indicated by the length 90 in FIG. 1 has been formed by helical winding, a suitable cutter indicated schematically by cutting blade 91 is employed to cut through the conduit 23 to define length 90 thereof.

The length 90 of conduit 23 at this point has a plurality of members or segments 33 therewithin. The members are such that they are readily reused and to facilitate this the length 90 of conduit 23 is turned so that the members 33 are poured from therewithin into a suitable receptacle 92. Conveyor means indicated schematically by dotted lines and arrows 93 is employed to return the members 93 into a specially designed introducing device 94 which introduces such members into an enlarged area portion of the helical groove 41 whereupon such members flow smoothly into position and are retained by the retaining means 60 in the manner previously described. The cut conduit length is then introduced on the conveyor 25 and the conveyor moving means 30 moves such conduit through the curing oven 26 and cooling chamber 27 and on to suitable packaging and storage means as described earlier. The conduit 23 is illustrated in detail in FIG. 2 and 3 and it will be seen that such conduit has a substantially smooth inside surface 95 and a substantially smooth outside surface 96.

The conduit 23 is shown by cross hatching in the drawings as being made of a synthetic plastic material and it will be appreciated that any suitable synthetic plastic material may be employed for this purpose. In addition, it is to be understood that any polymeric material may be used to define conduit 23 including not only synthetic plastic materials but rubber compounds, or the like.

The various components comprising the mandrel 21 may be made of any suitable material employed in the art. For example the splined shaft 35, helical structure 37, members 33 may be made of any suitable metallic or non-metallic material. In the presentation of FIG. 6 the cross hatching for the members 33 and structure 37 is shown as general cross-hatching which may indicate metal; however, to emphasize that the members 33 may be made of a non-metallic material reference is made to FIG. 7 which illustrates such members made of a synthetic plastic material and it will be appreciated that the synthetic plastic material may be a thermoplastic material and be such that it has optimum antifriction properties facilitating its sliding movement within the helical groove 41 while being retained in position by its retaining means 60.

Figure 2:
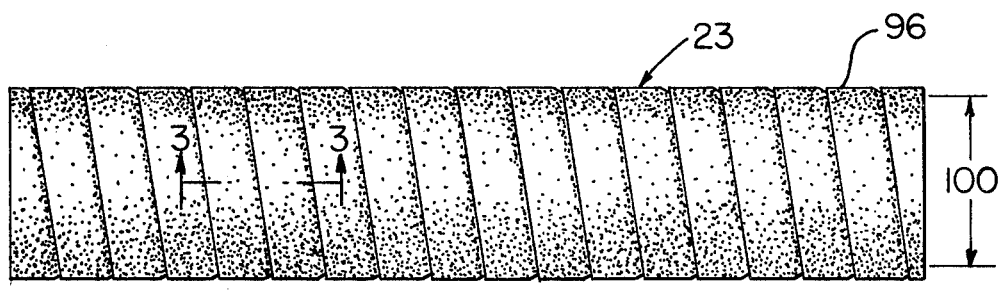
FIG. 2 is a view in elevation of a length of tubular conduit made by the machine and method of FIG. 1.

It will also be appreciated that the apparatus and method of this invention enables the provision of conduit 23 having a minimum diameter with such minimum diameter being indicated by the inside diameter 100 of the conduit 23 as illustrated in FIG. 2.

It will also be appreciated that the concept of this invention of utilizing members 33 to define a substantially complete live surface LS lends itself to utilization of such members to define conduits having different inside diameters merely by varying the distance the arms 47 of such members 33 extend outwardly of the surface 53 of the helical structure 37 as shown at 101 in FIG. 7 whereby the basic mandrel 21 may be used to define conduits 23 having a large number of different inside diameters merely by changing members 33.

While present exemplary embodiments of this invention, and methods of practicing the same, have been illustrated and described, it will be recognized that this invention may be otherwise variously embodied and practiced within the scope of the following claims.

What is claimed is:

1. In a machine for making a substantially smooth inside surface tubular conduit of indefinite length comprising; an elongate mandrel supported at one end and unsupported at its opposite end; apparatus carried by said mandrel and being rotatably and axially movable therealong between said opposite ends, said apparatus being adapted to support material wound thereon to define a length of said tubular conduit and moving out of supporting relation once said length of tubular conduit moves axially beyond said opposite end; the improvement wherein said mandrel comprises a rotatable central part, a helical structure supported in a cantilevered manner at said one end and at a fixed position concentrically around said central part with said central part being rotatable therewithin, said helical structure defining a helical groove along said mandrel, and a plurality of members defining said apparatus, each of said members having a portion extending within said helical groove and being operatively connected to said central part and movable by said central part along said helical groove in the helical path defined thereby with rotation of said central part, said members being adapted to support said material thereon and moving out of said supporting relation by falling by gravity within said length of tubular conduit at said opposite end.

2. In a machine as set forth in claim 1 the further improvement in which said central part is a splined shaft having axially extending circumferential teeth and each of said members has cooperating teeth which engage said circumferential teeth and provide said operative connection.

3. In a machine as set forth in claim 2 the further improvement comprising retaining means acting between said members and helical structure preventing radial movement of said members relative to said helical structure and splined shaft.

4. In a machine as set forth in claim 3 the further improvement in which said retaining means comprises a projection provided on one of said helical structure and members and a cooperating channel on the other of said helical structure and members, said projection being received in said channel and preventing said radial movement.

5. In a machine as set forth in claim 4 the further improvement in which each of said members has an arcuate outside surface, and the arcuate outside surfaces of said members define a helical surface overlying said helical groove.

6. In a machine as set forth in claim 5 the further improvement in which each of said members has a substantially T-shaped cross-sectional configuration defined by a leg and a pair of transverse arms extending from opposite sides of said leg, said leg having a width which enables receipt thereof within said groove for easy movement therealong and each of said arms extending from its associated side of said leg a distance slightly less than one-half the width of said helical structure, said arms having top surfaces which define surface extensions of an associated arcuate outside surface, said arcuate surfaces and surface extensions defining a substantially full right circular cylindrical surface which is considered a live surface with rotation of said splined shaft, and said portion of each member disposed within said helical groove comprising at least part of said leg thereof.

7. In a machine as set forth in claim 5 the further improvement in which each of said members is made of a metallic material.

8. In a machine as set forth in claim 5 the further improvement in which each of said members is made of a hard polymeric material.

9. In a machine as set forth in claim 5 the further improvement comprising antifriction bearing means between said helical structure and said splined shaft.

10. In a machine as set forth in claim 9 the further improvement in which said splined shaft has a pair of plain right circular cylindrical ends and said antifriction bearing means comprises a pair of bearing assemblies each acting between said helical structure and an associated one of said plain cylindrical ends.

11. In a machine as set forth in claim 9 the further improvement comprising an extension extending from the plain right circular cylindrical end at the supported end of said mandrel and drive means for rotating said extension and splined shaft.

12. In a method of making a substantially smooth inside surface tubular conduit of indefinite length comprising the steps of; supporting an elongate mandrel at one end with its opposite end being unsupported; carrying apparatus on said mandrel so that said apparatus is rotatably and axially movable therealong between said opposite ends; continuously unwinding material on said apparatus to define a length of said tubular conduit and with said apparatus moving out of supporting relation once said length of tubular conduit moves axially beyond said opposite end; the improvement comprising the steps of, providing said mandrel comprising a rotatable central part, fastening a helical structure in a cantilevered manner at said one end and at a fixed position concentrically around said central part with said central part being freely rotatable therewithin, said helical structure defining a helical groove along said mandrel, and disposing a portion of each of a plurality of members defining said apparatus within said helical groove and operatively connecting each member to said central part to provide movement thereof by said central part along said helical groove in the helical path defined thereby with rotation of said central part, said members being adapted to support said material wound thereon and moving out of said supporting relation by falling by gravity within said length of said tubular conduit at said opposite end.

13. In a method as set forth in claim 12 the further improvement in which, said step of providing said mandrel comprising a rotatable central part comprises providing said central part as a splined shaft having axially extending circumferential teeth, and forming members with cooperating teeth which engage said circumferential teeth and provide said operative connection.

14. In a method as set forth in claim 13 the further improvement comprising the step of retaining said members in said groove employing retaining means acting between said members and said helical structure to prevent radial movement of said members relative to said helical structure and splined shaft.

15. In a method as set forth in claim 14 the further improvement comprising forming each of said members with an arcuate outside surface so that following said disposing step the arcuate outside surfaces of said members define a helical surface overlying said helical groove.

16. In a method as set forth in claim 15 the further improvement in which said forming step comprises forming each of said members with a substantially T-shaped cross-sectional configuration defined by a leg and a pair of transverse arms extending from opposite sides of said leg, said leg having a width which enables receipt thereof within said groove for easy movement therealong and each of said arms extending from its associated side of said leg by a distance slightly less than one-half the width of said helical structure, said arms having top surfaces which define a surface extension of an associated arcuate outside surface, said arcuate surfaces and surface extensions defining a substantially full right circular cylindrical surface which is considered a live surface upon rotating said splined shaft, and said step of disposing a portion of each of said members comprises disposing at least part of said leg thereof.

17. In a method as set forth in claim 15 the further improvement in which said step of continuously winding material comprises the steps of winding a polymeric strip of rectangular cross section with overlapped portions and winding a reinforcing member in sandwiched relation between said overlapped portions to define said tubular conduit as a reinforced tubular conduit.

18. In a method as set forth in claim 17 in which said step of winding a reinforcing member comprises winding a reinforcing wire which is partially preformed prior to winding thereof between said overlapped portions.

19. In a method as set forth in claim 15 the further improvement in which said step of winding a polymeric strip comprises winding said polymeric strip immediately after extrusion thereof from an extrusion apparatus and prior to cooling thereof.

20. In a method as set forth in claim 17 the further improvement comprising the steps of, cutting said tubular conduit to define a length thereof of a predetermined dimension once such length moves axially beyond said opposite end, removing said members from within said length of tubular conduit at said opposite end after cutting thereof, and again disposing said members into said groove such that a predetermined number of said members are constantly recirculated and used to provide said tubular conduit in a continuous uninterrupted manner.

* * * * *

UNITED STATES PATENT OFFICE
CERTIFICATE OF CORRECTION

Patent No. 4,174,984                   Dated November 20, 1979

Inventor(s) Roger D. Meadows

It is certified that error appears in the above-identified patent and that said Letters Patent are hereby corrected as shown below:

Column 4, line 19, "51" second occurrence should be -- 41 --.

Signed and Sealed this

Twenty-sixth Day of February 1980

[SEAL]

Attest:

SIDNEY A. DIAMOND

Attesting Officer      Commissioner of Patents and Trademarks